(12) United States Patent
Estevenon et al.

(10) Patent No.: US 6,273,346 B1
(45) Date of Patent: Aug. 14, 2001

(54) FLUID FUEL INJECTOR FOR AN INTERNAL COMBUSTION ENGINE

(75) Inventors: Christine Estevenon; Richard Croche, both of Osny (FR)

(73) Assignee: Sagem SA (FR)

( * ) Notice: Subject to any disclaimer, the term of this patent is extended or adjusted under 35 U.S.C. 154(b) by 0 days.

(21) Appl. No.: 09/530,111
(22) PCT Filed: Aug. 25, 1999
(86) PCT No.: PCT/FR99/02040
§ 371 Date: Apr. 25, 2000
§ 102(e) Date: Apr. 25, 2000
(87) PCT Pub. No.: WO00/12893
PCT Pub. Date: Mar. 9, 2000

(30) Foreign Application Priority Data

Aug. 28, 1998 (FR) .................................................. 98 10843

(51) Int. Cl.$^7$ ...................................................... F02M 61/20
(52) U.S. Cl. ..................................... 239/533.9; 239/585.5
(58) Field of Search ............................. 239/585.1–585.5, 239/533.2, 533.3, 533.4, 533.5, 533.6, 533.9, 533.11; 251/129.15

(56) References Cited

U.S. PATENT DOCUMENTS 5,288,025 * 2/1994 Cerny ................................ 239/533.9

FOREIGN PATENT DOCUMENTS

19625059 * 1/1998 (DE) .
2773851 * 1/1998 (FR) .

* cited by examiner

*Primary Examiner*—Lisa Ann Douglas
(74) *Attorney, Agent, or Firm*—Larson & Taylor, PLC

(57) ABSTRACT

An injector in a spark ignition engine combustion chamber has an injector body containing a needle with a closure element co-operating with a fuel passage seat extended by a diffusion port. The needle is axially movable between a first position wherein the closure element bears against the seat and a second position wherein the closure element is away from the seat, It further has a single-piece diabolo-shaped element fixed in the downstream part of the body, The seat, the diffusion port and a bore for slidingly guiding the needle are formed in the one-piece element. It defines, with the body downstream part of the body a fuel supply chamber and has ports communicating the chamber with the bore immediately upstream of the seat and emerging tangentially in the bore.

9 Claims, 1 Drawing Sheet

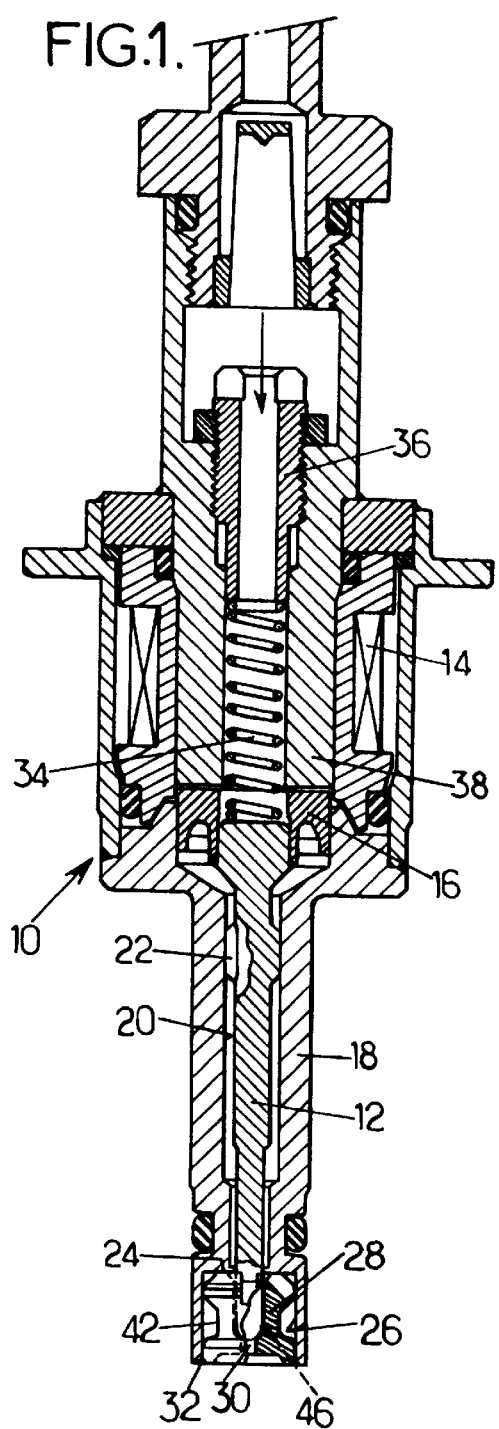
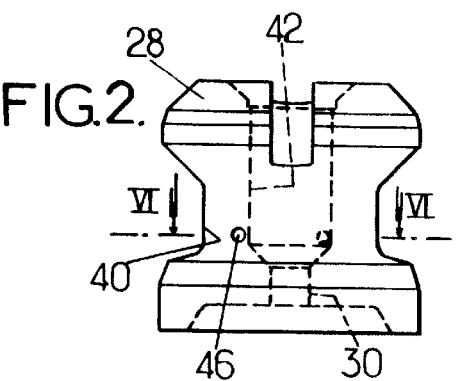
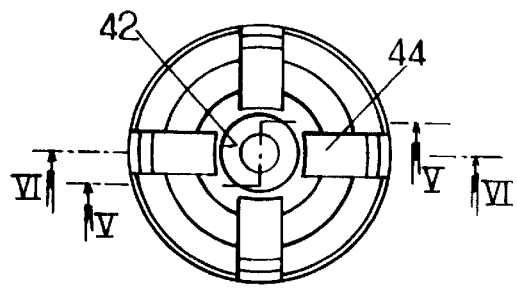
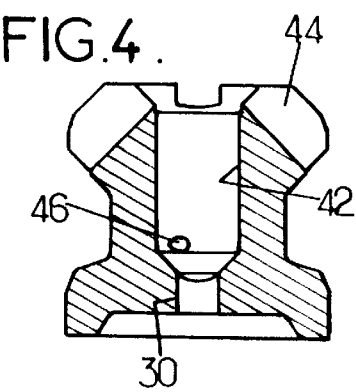
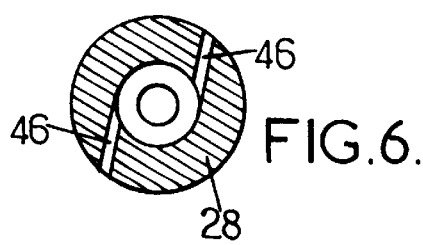
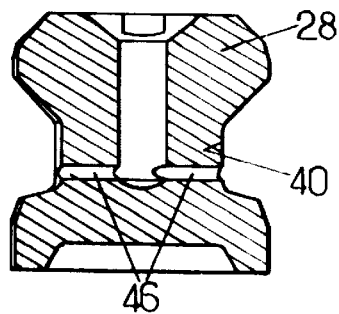

FLUID FUEL INJECTOR FOR AN INTERNAL COMBUSTION ENGINE

BACKGROUND OF THE INVENTION

The present invention relates to injectors for injecting fuel in the fluid state, and in particular in the liquid state, and designed to inject the fuel directly into a combustion chamber of a controlled ignition engine. It is particularly applicable to injecting gasoline, but it can also be adapted to other liquid fuels, such as alcohol-based fuels, and liquefied petroleum gas.

Direct injection injectors are already known comprising an injector body containing a needle that is axially movable by electrical control means (often constituted by a coil) and terminated by a shutter element, often of hemispherical shape, that co-operates with a seat for passing fuel. The needle is movable between a first axial position in which the shutter element bears against the seat, and a position in which it is spaced apart therefrom.

The stresses imposed on the injector for direct injection are much greater than those imposed for indirect injection into the manifold. It is necessary simultaneously to limit the penetration depth of the fuel jet, e.g. to avoid wetting the walls of the chamber, and to provide mixing between air and fuel that is as intimate as possible for better combustion, and to do this even though the time available for injecting fuel is very short.

To achieve this result, attempts have already been made to impart turbulent motion to the fuel.

Patent application FR 98/00554 describes an injector having a chamber for putting the fuel into rotation about the axis of the shutter element, which chamber is situated upstream from the seat and is defined between a plurality of elements.

SUMMARY OF THE INVENTION

The present invention seeks in particular to provide a fuel injector that satisfies practical requirements better than previously known injectors, in particular in that it causes the fuel to be set into rotation by using means that are simple to implement, but nevertheless highly effective. The invention seeks in particular to reduce the "dead" volume that the injected fuel occupies without being set into rotation when the needle begins to open.

To this end, the invention provides an injector comprising a one-piece element fixed in the downstream portion of the body, in which element there are formed the seat, the spray orifice, and a hole for slidably guiding the needle, said element being dualcone-shaped or diabolo shaped so as to co-operate with said downstream portion of the body to define a fuel feed chamber having bores putting the chamber into communication with said hole immediately upstream from the seat and opening out tangentially into the hole, and passages for feeding the chamber.

The dead space is thus restricted to the small volume annular zone situated between the cylindrical portion of the needle and the circular bearing line on the seat.

In addition, the use of holes of circular cross-section, usually two to ten in number, presents the advantage of reduced head loss, the circular cross-section being that presents the greatest hydraulic radius at given cross-sectional area.

The holes can be in a plane orthogonal to the axis of the needle. Nevertheless, it is possible for them to slope from upstream to downstream. This possibility gives a degree of freedom in addition to those concerning the number and the diameter of the holes. A single turned blank can thus be adapted to different injectors.

The above characteristics and others will appear better on reading the following description of particular embodiments, given as non-limiting examples. The description refers to the accompanying drawing.

BRIEF DESCRIPTION OF THE DRAWINGS

FIG. 1 is an overall view of an injector to which the invention is applied;

FIG. 2 is an elevation view in half-section of the one-piece element of the injector shown in FIG. 1

FIG. 3 is a plan view of the guide of FIG. 2;

FIGS. 4 and 5 are section views on lines IV—IV and V—V of FIG. 3; and

FIG. 6 is a section view on lines VI—VI of FIG. 2.

DETAILED DESCRIPTION OF THE INVENTION

The injector whose general structure is shown in FIG. 1 comprises a body 10 made up of a plurality of assembled-together parts, within which there is to be found a needle 12 that is movable axially by a coil 14. For this purpose, the needle is fixed to a ring 16 of ferromagnetic material. The needle could equally well be controlled electrically by other means, e.g. by a stack of piezoelectric pellets, or it could even be controlled by fluid pressure.

In the end portion 18 of the body 10 there is provided a bore 20 for guiding swellings 22 on the needle 12. The bore 20 connects via a shoulder 24 to a chamber 26 having a one-piece element 28 fixed thereto. In the case shown in FIG. 1, the element 28 is fixed by a circular weld 32 made by laser or electron beam.

The element 28 constitutes a guide for the needle. To this end, it is pierced by a hole 42 of diameter such that the needle 12 can slide therein as a sliding fit. This hole opens out above a bearing surface for the needle and surrounding the inlet to a spray orifice 30.

In the example shown, the shutter element of the injector is constituted by the end of the needle 12. The bearing surface against which the needle bears is conical in shape, for example, whereas the end of the needle in its bearing zone is in the form of a spherical segment. The tip of the end portion of the needle can be conical so as to reduce the risk of cavitation.

A spring 34 compressed between the rear face of the needle 12 and an endpiece 36, and whose position is adjustable for adjustment purposes, urges the needle 12 against the bearing surface. The coil 14 allows the needle to be moved against the action of the spring 34 within limits determined by the ring 16 coming into abutment against a fixed sleeve 38, which can be made of a ferromagnetic material in order to complete the magnetic control circuit.

The one-piece element 28 is generally made of steel and manufactured by turning, machining its internal passages, polishing (e.g. electrochemically), and applying treatment to its surface or to its core. Given that it is a single piece, it is possible to obtain high precision concerning the relative locations of its various surfaces.

The element 28 is generally in the shape of a dual-cone. Between its upstream and downstream terminal portions, of diameter suitable for enabling the elements to be engaged as a sliding fit in the chamber 26, there is provided a groove 40

(FIG. 2). A plurality of sloping feed notches 44 are cut through its upstream portion, there being four such notches in the example shown, each of which opens out into the groove 40. A frustoconical chamfer can be provided between the upstream plane face of the element 28 and its cylindrical portion for greater progressivity.

The groove 40 communicates with the hole 42 via circular section bores 46 that are also distributed angularly, there being two of them in the example shown. These bores are oriented so as to open out tangentially into the hole 42, in the annular gap between the line where the needle bears against its bearing surface and the cylindrical portion of the needle, and that remains empty when the needle is pressed against the bearing surface. In practice, the bores open out in general immediately above the bearing surface (FIGS. 4 and 5).

The presence of the groove 40 reduces the length of the bores 46, but they must nevertheless retain sufficient length to set the fuel into rotation upstream from the bearing surface. In order to avoid giving the bores excessive length, the ratio of the diameter of the groove 40 to the diameter of the hole 42 is generally about 2:1. In practice, the bores will generally be given a length that is greater than their diameter. The dead volume between the outlets of the bores and the seat is very small, so little fuel is sprayed crudely without any vortex effect.

It can be seen that the path via which the fuel arrives upstream from the needle bearing surface comprises in succession:

annular clearance between the needle 12 and the inside wall of the end portion 18;

the notches 44 and the groove 40; and the two to ten bores 46.

The above-described disposition presents numerous advantages. Fuel is delivered in perfectly symmetrical manner because the element 28 is centered in the chamber 26. The flow rate characteristics of the injector can be modified in very simple manner, merely by providing a plurality of different sets of bores 46 and/or diameters for the spray orifice 30. The annular clearance has no significant effect on the flow rate that the injector can deliver.

Instead of being placed in a plane that is orthogonal to the axis, the bores can slope downwards by as much as 45°, thereby providing an additional parameter that can be adjusted.

What is claimed is:

1. A fuel injector for injecting fuel into a combustion chamber of a spark ignition engine, comprising:

an injector body having an axial passage, a one-piece element fixed within the body in a downstream portion of said axial passage, formed with a seat located between a spraying orifice and an axial bore, a needle terminated by a closure element for co-operating with said seat, said needle being slidably received in said bore and axially displaceable between a first axial position, in which the closure element bears against the seat, and a second axial position in which the closure element is spaced apart from the seat, said one-piece element being diabolo-shaped and co-operating with said downstream portion of the body to define an annular fuel feed chamber having a plurality of ports communicating the fuel feed chamber with said bore immediately upstream from the seat and opening out tangentially into the bore, and passage means for feeding the chamber with fuel from said axial passage.

2. An injector according to claim 1, wherein the ports are cylindrical and have a length greater than their transversal size.

3. An injector according to claim 1, wherein the ratio of an inside diameter of the chamber to a diameter of said bore is about 2:1.

4. An injector according to claim 1, having from two to ten said ports.

5. An injector according to claim 1, wherein said ports are located in a same plane which is orthogonal to an axis of the needle.

6. An injector according to claim 1 wherein the ports have a downward slope at an angle not exceeding 45°.

7. An injector for injecting fuel into a combustion chamber of a spark ignition engine, comprising:

an injector body, a one-piece element fixed within the body in a downstream portion thereof, formed with a seat communicating with a downstream spraying orifice and with an upstream axial bore, a needle terminated by a closure element co-operating with said seat, said needle being slidably received in said bore and axially displaceable between a first axial position, in which the closure element closes the seat, and a second position in which the closure element is spaced apart from the seat, said one-piece element being diabolo-shaped and having an annular outer recess co-operating with said downstream portion of the body to define a fuel feed chamber having a plurality of ports communicating the chamber with said bore immediately upstream from the seat and opening out tangentially into the bore, and passage means for feeding the chamber with fuel, comprising a plurality of sloping feed notches cut out in an upstream portion of the one-piece element, regularly distributed angularly, and opening out into the recess of the one-piece element that defines the feed chamber.

8. An injector according to claim 7, having a frustoconical chamfer between an upstream planar face of the one-piece element and a cylindrical portion thereof.

9. A fuel injector for injecting fuel into a combustion chamber of a spark ignition engine, comprising:

an injector body having a fuel inlet and an axial fuel flow passage, a one-piece element fixed within the body in a counterbore formed in a downstream portion of said passage in abutment against an end shoulder of said counterbore, formed with a seat communication with a fuel spraying orifice and with an axial bore, a needle terminated by a closure element for co-operating with said seat, said needle being slidably received in said bore and axially displaceable between a first axial position, in which the closure element bears against the seat, and a second axial position in which the closure element is spaced apart from the seat, said one-piece element being diabolo-shaped and co-operating with said downstream portion of the body to define an annular fuel feed chamber having two to ten ports communicating the chamber with said bore immediately upstream from the seat and opening out tangentially into the bore, and passage means within said injector body and one-piece element for feeding the chamber with fuel from said inlet.

* * * * *